United States Patent
Pandey et al.

(10) Patent No.: US 7,616,617 B2
(45) Date of Patent: Nov. 10, 2009

(54) SYSTEM AND METHOD FOR COMMUNICATING BEACON TRANSMISSIONS IN WIRELESS LOCAL AREA NETWORK (WLAN) SYSTEMS

(75) Inventors: Aparna Pandey, Chicago, IL (US); Randy L. Ekl, Lake Zurich, IL (US); Christopher G. Ware, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 383 days.

(21) Appl. No.: 11/427,555

(22) Filed: Jun. 29, 2006

(65) Prior Publication Data
US 2008/0002633 A1   Jan. 3, 2008

(51) Int. Cl.
*H04W 4/00* (2009.01)
(52) U.S. Cl. .................. 370/338; 370/328; 370/329; 455/41.2; 455/41.3; 455/432.1; 455/435.1; 455/435.2
(58) Field of Classification Search .............. 455/41.2, 455/41.3, 435.1, 435.2, 432.1; 370/328, 370/329, 338
See application file for complete search history.

(56) References Cited

U.S. PATENT DOCUMENTS

| 6,804,222 | B1 | 10/2004 | Lin et al. |
| 7,054,329 | B2 | 5/2006 | Cervello et al. |
| 7,260,399 | B1 * | 8/2007 | Oh et al. .................. 455/436 |
| 2002/0089927 | A1 | 7/2002 | Fischer et al. |
| 2004/0127220 | A1 | 7/2004 | Proctor, Jr. |
| 2005/0041670 | A1 * | 2/2005 | Lin et al. .............. 370/395.21 |
| 2006/0105771 | A1 * | 5/2006 | Iacono et al. ............ 455/446 |

FOREIGN PATENT DOCUMENTS

| WO | 2008002719 A2 | 1/2008 |
| WO | 2008002719 A3 | 1/2008 |

OTHER PUBLICATIONS

PCT International Preliminary Examination Report Application No. PCT/US07/68013 dated Jan. 15, 2009 - 10 pages.
PCT International Search Report and Written Opinion Application No. PCT/US07/68013 dated Oct. 8, 2008 - 10 pages.

* cited by examiner

*Primary Examiner*—Stephen M D'Agosta
(74) *Attorney, Agent, or Firm*—Randi L. Karpinia

(57) ABSTRACT

A method for transmitting beacon transmissions in a wireless local area network (WLAN) communications system (100) operating on one or more channels includes transmitting a first beacon (C1) using a directional antenna in a first direction (D1) on a first channel. A second beacon (C2) is then transmitted using a directional antenna in a second direction (D2) on the first channel. This process is then repeated such that the first beacon and second beacon after a predetermined beacon interval. The first beacon begins its transmission at a target beacon transmission time (TBTT) and the second beacon begins its transmission in a sequential period defined by an antenna switching time after the transmission of the first beacon.

15 Claims, 4 Drawing Sheets

SYSTEM AND METHOD FOR COMMUNICATING BEACON TRANSMISSIONS IN WIRELESS LOCAL AREA NETWORK (WLAN) SYSTEMS

RELATED APPLICATIONS

The present application is related to the following U.S. application commonly owned with this application by Motorola, Inc.: U.S. Patent Publication No. US20080002632A1, filed Jun. 29, 2006, titled "System And Method For Communicating Beacon Transmissions In Wireless Local Area Network (WLAN) Systems," the entire contents of which being incorporated herein by reference.

FIELD OF THE INVENTION

The present invention relates generally to wireless network access points (APs) and more particularly to beacon transmissions by APs having directional antennas.

BACKGROUND

The Institute of Electrical and Electronics Engineers (IEEE) standards define beacon transmissions in a number of ways including transmissions from access points (APs) in an infrastructure mode, from wireless local area networks (WLANs) and from clients in "ad hoc" mode. Those skilled in the art will recognize that in the WLAN environment, the "client" is the mobile station or user which utilizes the AP to establish wireless communications with other users or devices. Further, skilled artisans will recognize that the target beacon transmission time (TBTT) in a WLAN is governed by a common network timer called the "timing synchronization function" or the TSF timer and the beacon interval. These two information elements, which are carried in beacons and other management messages, allow for a unique TBTT during each beacon interval that is common to both the AP and all the clients served by that AP. The TBTT represents only a target or expected transmission time for beacons. However, in practice, the beacon transmission may be delayed due to various factors such as interference, loading or the like.

Although the IEEE standards govern system architecture, the beacon transmission methodology by sectorized APs is not well-defined. Those skilled in the art will recognize that a sectorized AP is an AP with multiple directional antennae forming multiple sectors. As described herein, the terms "sectors" and "directional antennae" are used interchangeably. Further, functionalities in a network with multiple tiers of APs and/or clients are even less defined by the standard.

One issue that requires resolution in such networks involves a "neighbor" discovery process at a client that is used to identify and discover sectors of the same AP. This discovery process is not defined by the current standards. Moreover, since beacon transmission times of sectors of the serving AP, where the serving AP is the AP that the client is associated with, are not known by a client or defined by the standards, intelligent scheduling of traffic to and from multiple sectors (for site diversity and efficient make-before-break handoff) cannot be accomplished. Efficient scheduling of traffic reception based on pending traffic notification in beacons is also not possible. In other words, the client may not be able to tell from which antenna and at what time interval to listen for the traffic without a high degree of signaling overhead. Prior art FIG. 1 illustrates such a wireless network 100 where the wireless access point 101 utilizes directional antennas defining sectors 103, 105, 107 and 109. If a client 111 were transitioning from sector 109 to sector 103, it is important that the client 111 receives the beacon traffic from the sector 103 of the access point 101 in a timely manner.

Hence, the client 111 may not be able to schedule uplink traffic efficiently since it may not know when its current sector is sending its beacon or actively receiving traffic. This will result in unnecessary re-transmissions and power drain at a portable client. These problems multiply in complexity when different antennas operate on different frequencies, requiring improved methods of propagating beacons in a wireless local area network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
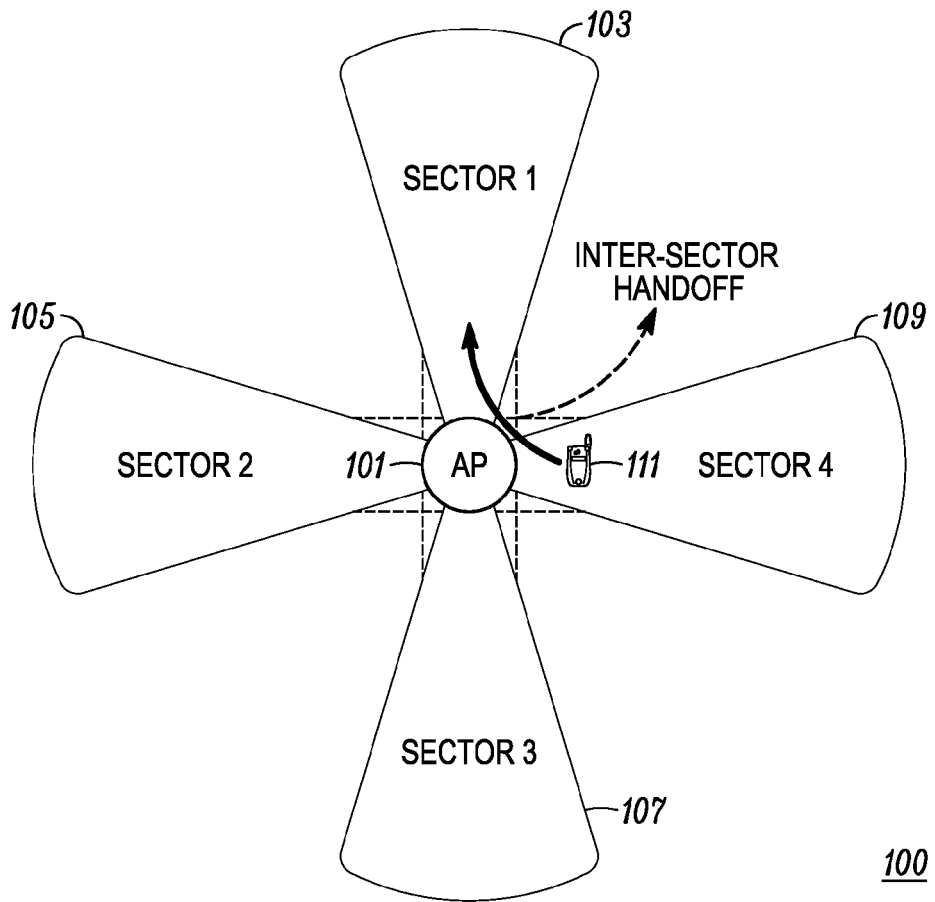
FIG. 1 is an illustration of a prior art wireless network including an access point with inter-sector handoff from one directional antenna to another within the same AP.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to transmitting and receiving beacon signals in a wireless local area network (WLAN). Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may utilize one or more conventional processors and unique stored program instructions that control the one or more processors to implement, in conjunction with certain non-processor circuits, some, most, or all of the functions of transmitting and receiving beacon signals in the WLAN described herein. The non-processor circuits may include, but are not limited to, a radio receiver, a radio transmitter, signal drivers, clock circuits, power source circuits, and user input devices. As such, these functions may be interpreted as steps of a method to perform transmit and/or receive beacon signals in a WLAN. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As described in FIGS. 2-6, the present invention comprises various embodiments whose solution includes components that control AP behavior and Client behavior to facilitate sector discovery and inter-sector handoff at the client. These components include 1) an AP's behavior where the AP transmits beacons on its different sectors in a pre-determined fashion and announces the details to clients; and 2) client behavior which utilizes the assistance provided by the AP for efficient sector discovery and inter-sector handoff. This permits the client to listen to the announcements made by the AP regarding its other sectors and uses the information to discover its own "reachability" or ability to communicate to these sectors.

With regard to AP behavior and sector beacon transmission and announcements, the AP's responsibility is to transmit beacons in each of its sectors at predictable times. The AP then announces to the clients information pertaining to sector beacon transmission times and channel numbers. The sector antennas (not shown) may operate on the same channel, different channels or a hybrid combination (i.e., some on one channel and some on another channel). The following description illustrates the beacon transmission method for each of these three cases and also the announcement method that the AP may use to inform the clients about the sector beacon propagation.

Figure 2:
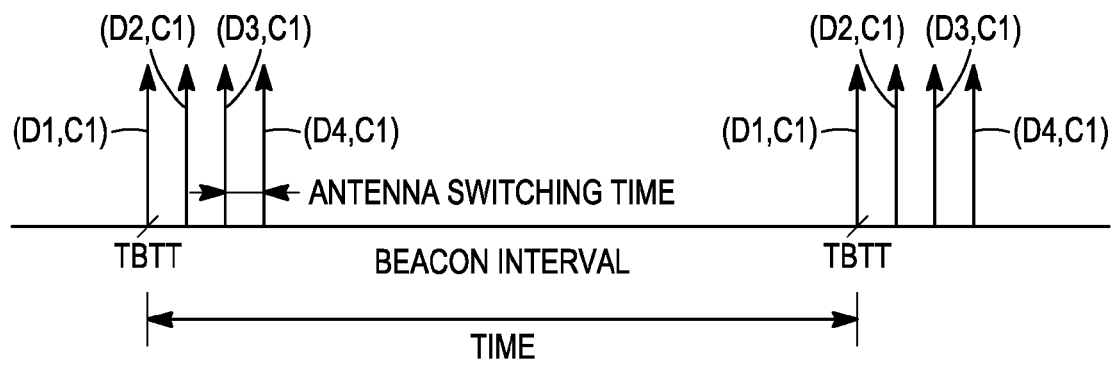
FIG. 2 illustrates a timing diagram for a sector beacon transmission by an access point where the sectors are on the same channel.

FIG. 2 illustrates a sector beacon transmission time line where the AP sectors all operate on the same channel. In the illustration, D1, D2, D3, D4 represent the various AP sector directions while C1 represents a single channel. Thus, in this example, the sector antennas are on the same channel (C1); the sector beacons are transmitted on the respective directional antennas (D1 to D4) individually in a sequence starting at a target beacon transmission time (TBTT) and separated by antenna switching time. Antenna switching time is defined minimally as the delay incurred during switching from one directional antenna to another (or, alternatively, switching the same directional antenna from one direction to another). In one embodiment, the antenna switching time can account for all the delays (for example, switching of hardware elements, switching of software elements etc.) incurred by the AP between transmitting the sector beacon in one sector and being ready to transmit a sector beacon in another sector. In one embodiment, one or more of the directional antennas (D1 to D4) are the same physical antenna, which switch directions to serve the four sectors. Hence, each of the four sectors use beacons ({D1,C1}, {D2,C1}, {D3,C1}, {D4,C1}), each transmitted in their respective direction (one on each directional antenna back to back) for each respective sector. These beacons are separated in time only by the time utilized to switch the AP antenna from sector to sector. The same TBTT or TSF timer is used by the AP to initiate the beacon propagation. In other words, only a single unique value of TBTT is generated and is used by both AP for beacon transmission and clients for beacon reception. FIG. 2 illustrates the D1 sector beacon starting at TBTT, followed by the D2, D3 and D4 sector beacons. It will be evident to those skilled in the art that it is possible to change the transmission order of the sector beacons "on the fly." This allows the clients in all sectors to have a fair beacon waiting period which enhances the power savings for portable devices.

Figure 3:
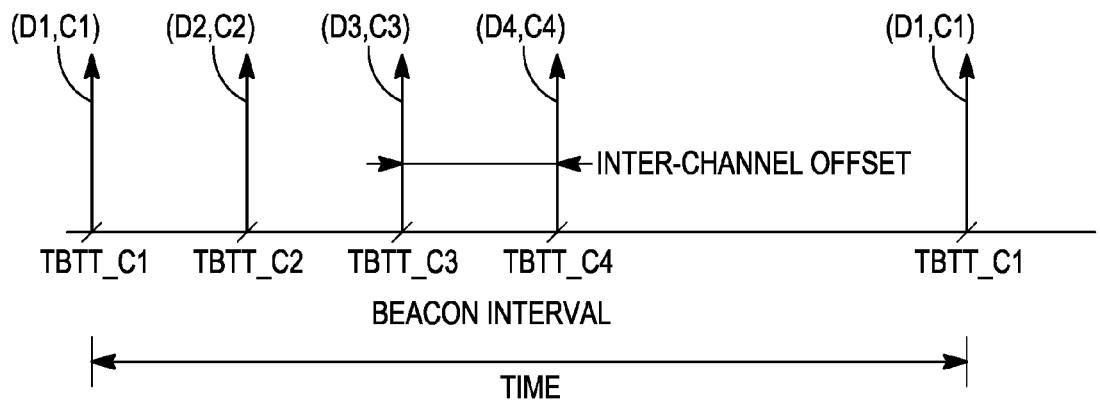
FIG. 3 illustrates a timing diagram for a sector beacon transmission by an access point where the sectors are on different channels.

FIG. 3 illustrates an alternative embodiment to that shown in FIG. 2 where beacon transmissions are separated by non-negligible offsets in time where sectors use different channels (C1, C2, C3, C4) for uniformity or for other reasons. The main difference in this embodiment, as opposed to having each sector on the same channel as shown in FIG. 2, is that a non-negligible antenna and frequency or channel switching delay is incurred while switching between the sectors. Therefore, every antenna and channel switch will carry some additional system overhead. In such a case, back-to-back beacon transmissions may cause unnecessary switching overhead. Thus, the sector beacons are spaced in time by some non-negligible "Inter-Channel Offset," which is much greater than the antenna switching time plus channel switching time. The sector beacons are transmitted on the respective directional antennas (D1, D2, D3, D4) and channels (C1, C2, C3, C4), separated by a non-negligible offset, "Inter-Channel Offset" which is much greater than the antenna and channel switch time. In this embodiment there are four sectors using four channels, where four beacons are transmitted using a directional antenna on its channel. These beacons are separated by "Inter-Channel Offset." Since the sector beacons are transmitted at distinct time intervals, each sector needs its own TSF Timer and TBTT. Therefore, there are four virtual TBTTs (one for each sector) in an AP. As seen in FIG. 3, each sector beacon is transmitted at its own virtual TBTT, namely, TBTT_C1, TBTT_C2, TBTT_C3 and TBTT_C4. Note that four sectors and four channels is only an example. In another embodiment of this invention, the channels C1, C2, C3, C4 are one and the same. In another embodiment of this invention, there could be "n" channels and "m" antennas, with "n" less than "m" and still use the scheme described above, using "m" virtual TBTTs.

Figure 4:
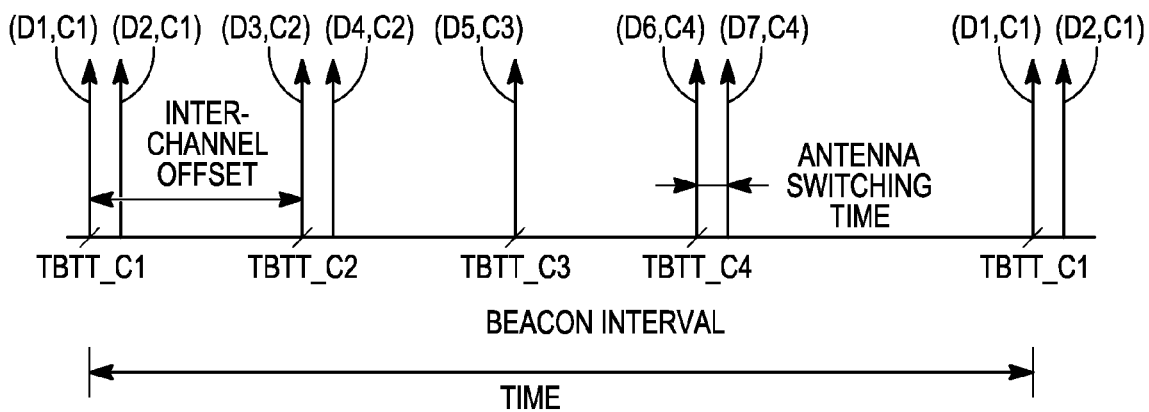
FIG. 4 illustrates a timing diagram for a sector beacon transmission by an access point where the sectors utilize a hybrid channel plan.

In yet another embodiment, FIG. 4 illustrates a sector beacon transmission where each of the sectors operates as a hybrid of that disclosed in FIG. 2 and FIG. 3. Thus, sectors on the same channel are tied to a single virtual TBTT and are transmitted back to back at that virtual TBTT. However, there are "m" virtual TBTTs, where "m" is the total number of channels amongst all the sectors of the given AP. The virtual TBTTs are spaced apart by non-negligible "Inter-Channel Offset." In this example, sectors D1 and D2 utilize channel C1, and sectors D3 and D4 utilize channel C2. The virtual TBTTs for beacons for D1 and D3 are separated by inter-channel offset. Similarly, a new sector D5 is designed for the use of channel C3 and sectors D6 and D7 are used with channel C4. As seen in FIG. 4, each channel has its own unique virtual TBTT, namely, TBTT_C1, TBTT_C2, TBTT_C3 and TBTT_C4. In another embodiment of this invention, the channels C1, C2, C3, C4 are one and the same. In other embodiments of this invention, any combination of channels could be reused with the appropriate grouping of antennas and channels.

In operation, the AP needs to announce some sector-specific information to the clients for facilitating fast sector discovery and inter-sector handoff. This information can include such information as sector number, virtual TSF timing (used for calculating virtual TBTTs) and number of channels. Specifically, the client may use a sector number to differentiate various sectors in order to determine its association. Those skilled in the art will recognize that the sector number can be carried inside management frames like beacons/probe responses/association responses and the like. Thus, the AP may use many known techniques for such an announcement.

As noted herein, the TSF timer is carried in beacons and other management messages, and is used to calculate a unique TBTT in a beacon interval corresponding to a single AP as well as all the clients associated with it. This, in turn, assists the client in predicting the TBTT of its AP. In the embodiment shown in FIG. 2, this methodology is reused since a unique TBTT in a beacon interval is required. However, in many subsequent embodiments of the present invention, there is a need to support multiple virtual TBTTs in the same beacon interval to support efficient beaconing by an AP with multiple sectors. Further, the clients need to be able to predict the virtual TBTT of at least the sector where they are associated. In order to determine this location, the virtual TSF timer values are transmitted in the beacons and probe responses of each respective sector. These values can either replace the TSF timer value that can be carried in another proprietary field, or can be inferred from the sector information element (IE) as defined herein.

The virtual TSF timer values are calculated using the equation:

$$TSF\_timerCi = Master\_TSF\_Timer + (i-1)*Offset$$

where i=the channel number; the Master_TSF_Timer is the main or real TSF timer running (or being continually recorded) in the AP; and the Offset is the Inter Channel Offset.

It will be evident to those skilled in the art that the equation assumes a virtual TSF timer per channel, but this may be generalized to include a virtual TSF timer per sector or per group of sectors by interpreting the value of "i" and Offset, accordingly.

Further, a novel information element (referred to as sector information element herein) can be added to carry all the information regarding the other sector beacons to ease sector discovery at the clients. This can be carried by the beacon/association response/probe response. The sector IE may include one or more of fields shown in Table 1, with respect to FIG. 4. However, those skilled in the art will recognize that the virtual TBTTs can be sector-based (not channel-based) where this information can be generalized in terms of sectors or any other alternative.

The "Number of Channels" is the value of total number of channels used by the sectors of the given AP. For example in FIG. 4, there are four channels used. The "Channel Number [i]" is the channel number for which the virtual TSF timer is represented by TSF_timerCi. It should be noted that the virtual TBTT values are in the increasing order of i (i=1, 2 ... n, where n=number of channels). For example in FIG. 4, there are four channels used, i.e., n=4. Further, Channel numbers C1,C2,C3,C4 are 1, 2, 3, 4 respectively. For example, Channel Number[2] is 2. The "Number of sectors[i]" is the number of sectors on "Channel Number[i]". For example, in FIG. 4, the number of sectors in channel C3 is 1. Therefore, Channel Number[3] is 3 and Number of sectors[3]=1. The "Offset" is the Inter-Channel Offset as shown in FIG. 4. Table 1 illustrates an example of Sector IE fields.

TABLE 1

Example Values of Sector IE fields

| Field | Value |
| --- | --- |
| Number of Channels | 4 |
| Channel Number[1] | 1 |
| Number of sectors[1] | 2 |
| Channel Number[2] | 2 |
| Number of sectors[2] | 2 |
| Channel Number[3] | 3 |
| Number of sectors[3] | 1 |
| Channel Number[4] | 4 |
| Number of sectors[4] | 2 |
| Offset | Inter-Channel Offset |

With regard to client behavior, the client's responsibility is to discover reachable sectors of its own AP or those belonging to its neighboring APs in order to determine the most appropriate sector for handoff. As noted herein, AP assistance is provided to aid sector discovery at the client. In addition, the client also has a responsibility in sector discovery. In the event that virtual TBTTs are implemented, the client need only use the virtual TBTT of its serving sector for synchronization purposes. This is accomplished using a given virtual TSF timer to calculate their timing information. As should be obvious to those of skill in the art, all the timing calculations performed by the client as described in the subsequent sections can be calculated with respect to the virtual TSF timer of the client's serving sector or its serving AP.

Insofar as sector beacon reception where sectors utilize the same channel and the beacon transmission methodology follows FIG. 2 (that is with one unique TBTT), the client calculates the TBTT based on its own sector beacon. At the TBTT, the client waits for beacons of its own sector and other sectors of its serving AP. The received sector beacons indicate the reachable sectors. In sectors of the neighboring AP where sectors utilize the same channel and the beacon transmission methodology follows FIG. 2, the client calculates the TBTT of its neighboring AP using procedures well known in the art such as neighbor reports from the serving AP, active scan, passive scan etc. During neighbor discovery, the client waits for beacons of the neighboring AP's sectors starting from the TBTT of the given neighbor. The received sector beacons indicate the "reachable" sectors, i.e., those to which it can communicate. Those skilled in the art will recognize that a legacy client may receive multiple back-to-back beacons if the client is in an overlapping sector region. However, each of the beacons will carry the updated value for mapping to the same TBTT value and thus the client will use the latest information available.

In situations where sectors of the serving AP are on different channels or the beacon transmission methodology follows those shown in FIG. 3 or FIG. 4 (i.e., with multiple virtual TBTTs per beacon interval), the client calculates its virtual TBTT based on its own sector beacon. Further, the client learns of other virtual TBTTs of its serving AP based on the information announced by the AP. During sector discovery, it waits for beacons of the other sectors of its serving AP at their respective virtual TBTTs and channel numbers. The received sector beacons indicate the "reachable" sectors which the client can communicate with.

In sectors of the neighboring AP, where sectors of the neighboring AP are on different channels or the beacon transmission methodology follows those shown in FIG. 3 or FIG. 4, the client calculates at least one virtual TBTT and other related information of its neighboring AP using a neighbor report, active scan, passive scan or the like. During neighbor discovery, the client waits for beacons of the neighboring AP's sectors at their respective virtual TBTTs and channel number. The received sector beacons indicate those sectors which are "reachable" i.e., sectors in which communication is possible. Legacy clients will receive only one beacon on the channel where it is operating with the virtual TSF timer to enable it to calculate the virtual TBTT value. Thus, legacy clients can operate as usual.

In situations where sectors of the serving AP are on hybrid sector channel plan or the beacon transmission methodology follows those shown in FIG. 4, the client calculates its virtual TBTT based on its own sector beacon. Further, it learns the other virtual TBTTs and sectors per virtual TBTT of its serving AP based on the information announced by the AP. During sector discovery, the client waits for beacons of the other sectors of its serving AP at their respective virtual TBTTs and channel numbers. The received sector beacons indicate the reachable sectors.

For sectors of the neighboring AP, where sectors of the neighboring AP are on hybrid sector channel plan or the beacon transmission methodology follows those shown in FIG. 4, the client calculates at least one virtual TBTT and other related information of its neighboring AP through known techniques such as neighbor report, active scan, passive scan or the like. During neighbor discovery, it waits for beacons of the neighboring AP's sectors at their respective virtual TBTTs and channel number. The received sector beacons indicate the reachable sectors. As noted herein, a legacy client may again receive multiple back-to-back beacons on its own channel. As mentioned earlier, it will not impact its operation.

Figure 5:
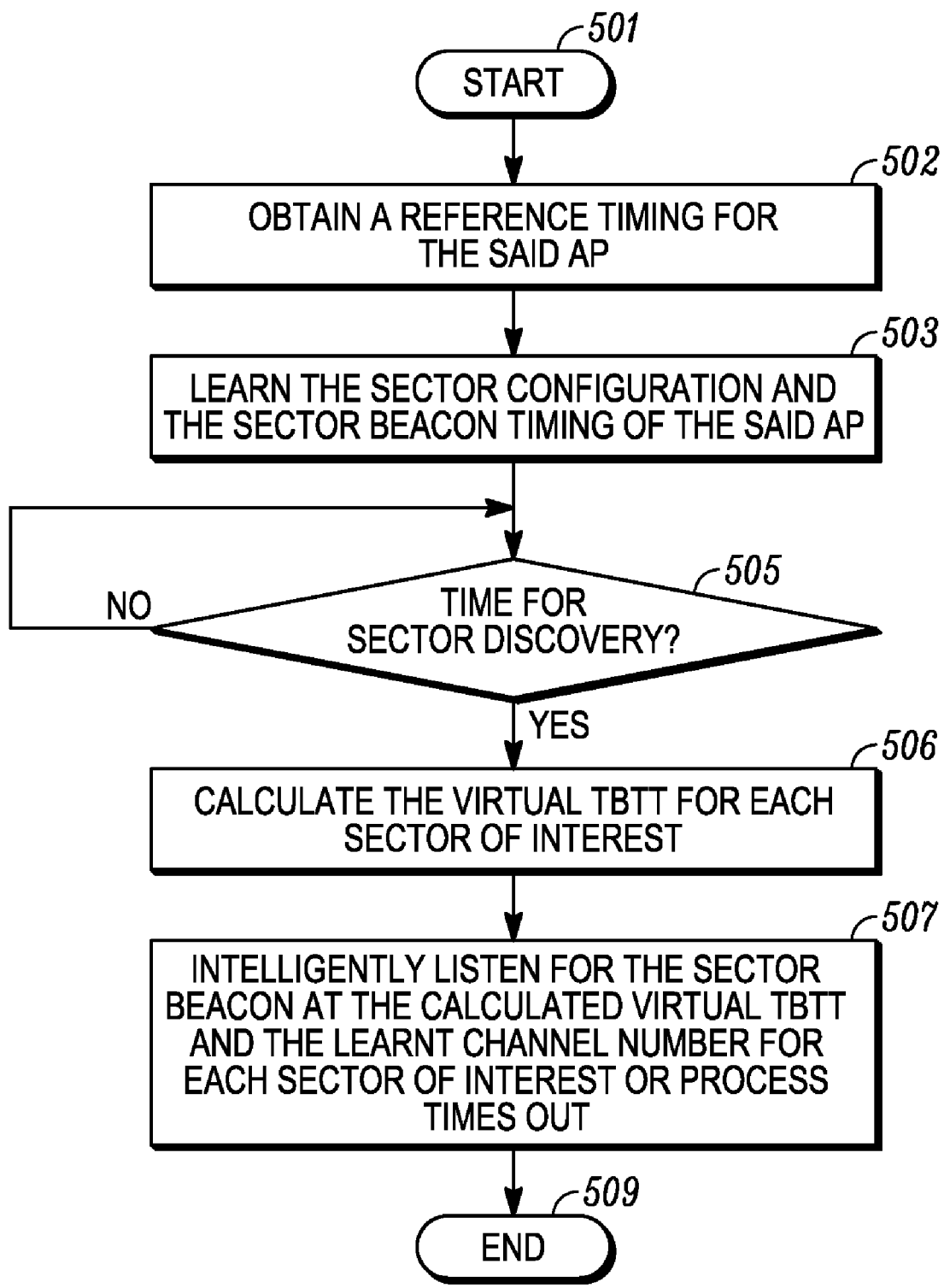
FIG. 5 is a flow chart diagram illustrating the sector discovery process by a client.

FIG. 5 illustrates the method 500 used by a client for sector discovery of the AP, where the AP can be defined as the serving AP of the client or a neighboring AP. As disclosed herein the process is started 501 and a reference timing for the AP is obtained 502, where the reference timing for the AP is the virtual TBTT or the virtual TSF timer associated with at least one sector of the AP. In case the AP is the serving AP, the reference point can be the virtual TBTT or the virtual TSF timer of the serving sector. When the AP is a neighboring AP, the client can obtain the reference timing of its neighboring AP using procedures well known in the art such as neighbor reports from the serving AP, active scan, passive scan, etc.

The client learns the sector configuration and the sector beacon timing of the AP 503. The sector configuration of the AP includes at least one of the number of channels, the number of sectors and the number of sectors per channel used at the AP. The sector beacon timing may include at least one of the virtual TSF timer value for a sector, inter-channel offset and beacon interval. In one embodiment, the client learns the relevant information, i.e., the number of channels and the number of sectors of the given AP and the sector beacon timing of each sector beacon through sector-specific announcement from either its serving AP or the AP in accordance with the sector-specific announcement transmitted by the APs as described earlier. In another embodiment, this information is preconfigured in the client.

When it is time for sector discovery at the client, this determination is made 505 and once that time has occurred, the client then calculates the estimated virtual TBTTs associated with each sector of interest in 506. The client calculates the estimated virtual TBTT of a given sector based on at least one of the learned number of channels, the number of sectors per channel and sector beacon timing from 503 and the reference timing for the AP as obtained in 502. During this step the client may also calculate the channel number of each sector of interest.

The client then intelligently listens for the sector beacon signal at the calculated virtual TBTT 507 as well as the learnt channel number for each sector of interest. Once the relevant information such as the sector beacon signal is received or the process times out, the process is completed 509.

Inter-sector handoff is defined as handoff of a client's traffic streams between sectors of the same AP. In other words, after a successful inter-sector handoff, the client's downlink traffic stream will be delivered through the new sector as opposed to the old sector. For inter-sector handoff, since the client is already associated with the AP, inter-sector handoff can take place in an implicit manner so that explicit association/authentication is not required. If a client-initiated access scheme is employed, then the client may transmit a trigger frame to the AP to either retrieve or transmit its traffic when the new sector antenna is active. The AP, at receiving this trigger frame via its given sector antenna, implicitly associates this client to the new sector. If the employed channel access scheme is not client-initiated, then the client may need to transmit a dummy frame or a data frame (if available) to the AP when the new sector antenna is active to achieve the implicit inter-sector handoff. For pure contention-based schemes (Distributed Coordination Function (DCF), Enhanced Distributed Channel Access (EDCA), or the like), the client can transmit this frame as soon as it can (using contention-based procedures). For pure polling/schedule based schemes (Point Coordination Function (PCF), Hybrid Coordination Function Controlled Channel Access (HCCA), or the like), the client will need to wait until the channel is available to send this frame (using contention-based procedures).

Figure 6:
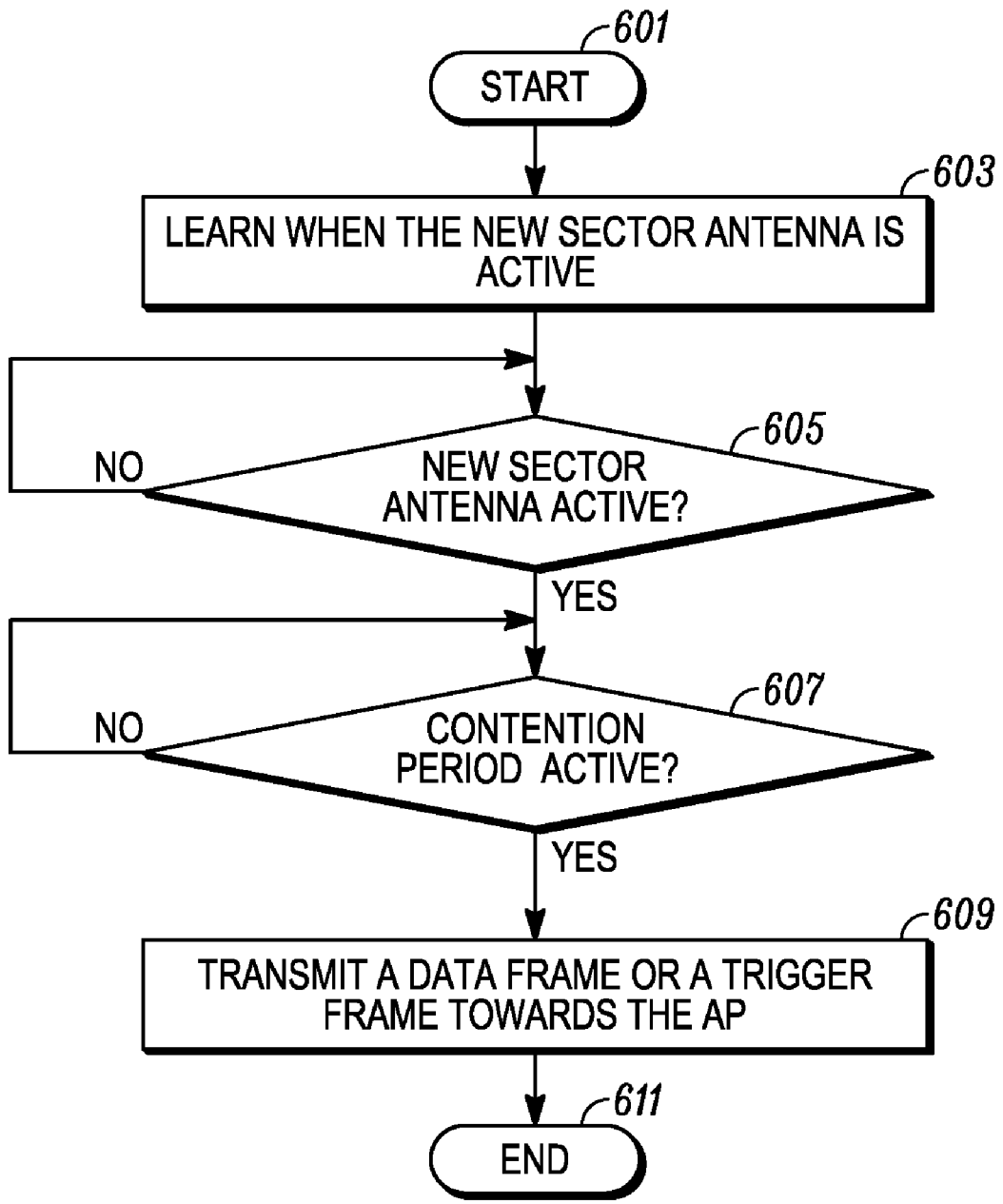
FIG. 6 is a flow chart diagram illustrating an inter-sector handoff between sectors of the same access point.

FIG. 6. illustrates the method by which inter-sector handoff, i.e., handoff between sectors of the same AP occur 600. This process is started 601 and the client learns when the new sector antenna is active at the AP 603. The new sector antenna herein refers to the antenna associated with the sector that the client is attempting to hand off to. If the new sector antenna is active 605, a determination is made whether the client is in a contention period 607. The contention period herein refers to a time interval determined by the AP during which any client or the AP may initiate transmission of frames after observing well-known channel access rules like random back off, deference, etc. If in a contention period, then the client transmits a data frame or trigger frame toward the AP using the contention-based access methods well-known in the art such as a distributed coordination function (DCF), enhanced distributed channel access (EDCA) and so forth. Thereafter, the process is completed 611.

Those skilled in the art will recognize that the invention described herein offers a number of advantages regarding neighbor discovery and handoff between sectors where a) the clients can identify and discover sectors of the same AP based on the beacons received from these sectors; and b) the clients can predict the beacon timing and channel number of the various sectors of an AP. Therefore, the client spends less time on neighbor discovery for sectors, increasing handoff efficiency and power savings.

This invention will also facilitate traffic bi-casting or n-casting for site diversity and efficient make-before-break handoff. In other words, same or different packets from multiple sectors can be sent to a client either to facilitate soft handoffs or provide site diversity. In such a case, the beacons of each involved sector will indicate the presence of traffic via the traffic indication maps. Non-overlapped sector beacons with predictable beacon transmission times will allow the client to look at all involved sector beacons and determine when to retrieve the packets from each of these sectors. Further, this method provides the client with a single association/authentication process with the AP rather than an association/authentication process per sector of the AP. Thus, site diversity can be seamlessly enabled without the need for additional association/authentication processes. Finally, the client can use the time during which non-reachable sectors of the serving AP are active to communicate with other reachable clients directly.

Thus, the present invention provides a novel method to propagate beacons across various sectors of the same AP. Fields are used to provide information such as sector number, virtual TSF timers, and sector IE to differentiate beacons of the various sectors. This method allows the AP to announce sector specific information to assist sector discovery and inter-sector handoff at the client. The present method permits the creation of multiple virtual TBTTs per beacon interval and sector discovery and inter-sector handoff.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of operation of an access point (AP) for transmitting beacon transmissions to different sectors in a wireless local area network (WLAN) communications system operating on a plurality of channels comprising:
   a) at a first virtual target beacon transmission time (TBTT) transmitting a first beacon signal on a first channel in one sector, wherein the first virtual TBTT is calculated using a first virtual timing synchronization function (TSF) timer, wherein the first virtual TSF timer value is calculated using a first channel number of the first channel, an inter-channel offset and a master TSF timer value, wherein the master TSF timer value comprises a real TSF timer continually recorded at the AP;
   b) at a second virtual TBTT transmitting a second beacon signal on at least one second channel in at least one other sector, wherein the second virtual TBTT is calculated using a second virtual timing synchronization function (TSF) timer, wherein the second virtual TSF timer value is calculated using a second channel number of the second channel, the inter-channel offset and the master TSF timer value;
   c) repeating a) through b) after a predetermined beacon interval.

2. A method for transmitting beacon transmissions in a WLAN as in claim 1, wherein the predetermined beacon interval is defined as the time between successive virtual TBTTs of the one sector.

3. A method for transmitting beacon transmissions in a WLAN as in claim 1, wherein the first and second beacon signals are transmitted using at least one directional antenna.

4. A method for transmitting beacon transmissions in a WLAN as in claim 1, wherein the access point (AP) in the WLAN announces sector-specific information to clients for facilitating fast sector discovery and inter-sector handoff.

5. A method for transmitting beacon transmissions in a WLAN as in claim 4, wherein the sector-specific information includes at least one of a sector number, a virtual timing synchronization function (TSF) timing, an inter-channel offset, and a number of channels.

6. A method of operation of an access point (AP) for transmitting sector beacon transmissions in a wireless communications network (WLAN) operating on a plurality of channels for facilitating fast sector discovery and inter-sector hand-off comprising:
   a) at a first virtual target beacon transmission time (TBTT) transmitting a first beacon signal on a first channel in a first sector and at least a second beacon signal on the first channel in a second sector in a sequential period defined by an antenna switching time, wherein the first virtual TBTT is calculated using a first virtual timing synchronization function (TSF) timer, wherein the first virtual TSF timer value is calculated using a first channel number of the first channel, an inter-channel offset and a master TSF timer value, wherein the master TSF timer value comprises a real TSF timer continually recorded at the AP;
   b) at a second virtual target beacon transmission time (TBTT) transmitting at least a third beacon signal on a second channel in a third sector, wherein the second virtual TBTT is calculated using a second virtual timing synchronization function (TSF) timer, wherein the second virtual TSF timer value is calculated using a second channel number of the second channel, the inter-channel offset and the master TSF timer value;
   c) repeating a) through b) after a predetermined beacon interval.

7. A method for transmitting sector beacon transmissions in a WLAN as in claim 6, wherein b) further comprises:
   transmitting at least a fourth beacon signal on the second channel in a fourth sector in a sequential period defined by an antenna switching time after the transmission of the third beacon signal.

8. A method for transmitting sector beacon transmissions in a WLAN as in claim 6, wherein the predetermined beacon interval is defined as the time between an initial virtual TBTT in a) and new virtual TBTT at the start of a transmission in c).

9. A method for transmitting sector beacon transmissions in a WLAN as in claim 6, wherein each respective beacon signal is transmitted between respective sectors using at least one directional antenna.

10. A method for transmitting sector beacon transmissions in a WLAN as in claim 6, wherein the access point (AP) in the WLAN announces sector-specific information to clients for facilitating fast sector discovery and inter-sector handoff.

11. A method for transmitting sector beacon transmissions in a WLAN as in claim 10, wherein the sector-specific information includes at least one of a sector number, a virtual timing synchronization function (TSF) timing, a number of channels, an inter channel offset, and a number of sectors per channel.

12. A wireless local area network (WLAN) communications system operating on a plurality of channels comprising:

- at least one access point (AP) for providing communications amongst at least one sector;
- at least one directional antenna connected to the access point for transmitting a radio frequency (RF) signal to the at least one sector; and
- wherein a first beacon is transmitted using the at least one directional antenna in a first direction on a first channel at a first virtual target beacon transmission time (TBTT), wherein the first virtual TBTT is calculated using a first virtual timing synchronization function (TSF) timer, wherein the first virtual TSF timer value is calculated using a first channel number of the first channel, an inter-channel offset and a master TSF timer value, wherein the master TSF timer value comprises a real TSF timer continually recorded at the AP, and at least one second beacon is transmitted using a directional antenna in at least one second direction on a second channel at a second virtual target beacon transmission time (TBTT), wherein the second virtual TBTT is calculated using a second virtual timing synchronization function (TSF) timer, wherein the second virtual TSF timer value is calculated using a second channel number of the second channel, the inter-channel offset and the master TSF timer value.

13. A wireless local area network (WLAN) communications system as in claim 12, wherein the at least one sector encompasses the WLAN coverage area.

14. A wireless local area network (WLAN) communications system as in claim 12, wherein the AP announces sector-specific information to clients for facilitating fast sector discovery and inter-sector handoff.

15. A wireless local area network (WLAN) communications system as in claim 14, wherein the sector-specific information includes at least one of a sector number, a virtual timing synchronization function (TSF) timing, an inter-channel offset, a number of channels, and a number of sectors per channel.

* * * * *